United States Patent [19]
Judkins et al.

[11] Patent Number: 5,647,039
[45] Date of Patent: Jul. 8, 1997

[54] OPTICAL SWITCHING SYSTEM AND DEVICES USING A LONG PERIOD GRATING

[75] Inventors: Justin Boyd Judkins, Berkeley Heights; Andrew John Stentz, Scotch Plains; Ashish Madhukar Vengsarkar, Berkeley Heights, all of N.J.

[73] Assignee: Lucent Technologies Inc., Murray Hill, N.J.

[21] Appl. No.: 572,588

[22] Filed: Dec. 14, 1995

[51] Int. Cl.$^6$ .................................................. G02B 6/26
[52] U.S. Cl. .......................... 385/37; 385/144; 385/142
[58] Field of Search ................................. 385/37, 1, 29, 385/123, 144, 142

[56] References Cited

U.S. PATENT DOCUMENTS

| | | | |
|---|---|---|---|
| 5,042,897 | 8/1991 | Meltz et al. | 385/37 |
| 5,042,898 | 8/1991 | Morey et al. | 385/37 |
| 5,048,913 | 9/1991 | Glenn et al. | 385/37 |
| 5,235,657 | 8/1993 | Tardy | 385/48 |
| 5,412,496 | 5/1995 | Nakajima et al. | 359/152 |
| 5,430,817 | 7/1995 | Vengsarkar | 385/37 |

*Primary Examiner*—John Ngo

[57] ABSTRACT

The present invention provides an optical switching system for use with an optical fiber that has a core of a prescribed refractive index and a cladding and that is configured to carry an optical signal of a prescribed bandwidth. Preferably, the optical fiber's core includes a photosensitive dopant. In a preferred embodiment, the optical switching system comprises an optical switch coupled to the optical fiber and includes a grating within the core. The optical switch has selectable non-diverting and forward-diverting modes of operation wherein the optical switch alters the prescribed refractive index: to render the grating substantially transparent to the optical signal as the optical switch operates in the non-diverting mode or, alternatively, to allow the grating to divert at least a portion of the optical signal forward and into the cladding as the optical switch operates in the forward-diverting mode. The grating rating preferably has a periodicity that increases a sensitivity of the grating to changes in the refractive index.

24 Claims, 5 Drawing Sheets

OPTICAL SWITCHING SYSTEM AND DEVICES USING A LONG PERIOD GRATING

TECHNICAL FIELD OF THE INVENTION

The present invention is directed, in general, to optical systems and devices and, more specifically, to optical systems and devices employing a long period grating.

BACKGROUND OF THE INVENTION

Optical fibers are key components in modern telecommunications. These key optical fibers are thin strands of glass capable for transmitting an optical signal containing a large amount of information over long distances with very low loss. In essence, an optical fiber is a small diameter waveguide characterized by a core with a first index of refraction surrounded by a cladding having a second, lower index of refraction. Typical optical fibers are made of high purity silica with minor concentrations of dopants to control the index of refraction.

As well known, single fibers can carry multiple packets of data that are multiplexed on the fiber either by time division where different slots of time are allocated to different packets or by wave division multiplexing where different wavelengths are allocated for different data. Modulators and switches that perform the important function of adding information content to optical signals in optical communications systems have been fabricated in the past using several different techniques. The most popular ones are based on the electrooptic effect in lithium niobate substrates. Other means of achieving the same are based on gallium arsenide technology or use indium as an active dopant in the planar waveguides.

All the techniques have been implemented on planar structures and hence suffer from two common problems; 1) interconnection losses to optical fibers are high, and 2) optical properties of the two polarizations are very different. Therefore, there is a need for an all-fiber modulator, which due to its circular symmetry and compatibility with the information transmission medium (fiber), sidesteps both the aforementioned problems in existing technologies.

In other applications of optical fiber communication systems, it is desirable to remove the light carrying the optical data or "tap" it out from the core of the fiber to either filter out certain wavelengths of light or to read certain signals passing through the optical fiber to insure power or data quality within the optical fiber. A switchable tap is useful when the tapped light is needed on an intermittent basis.

Typically, the light removal has been accomplished by the use of short periodic gratings written into the fiber's core. Other types of devices used to remove light from the optical fiber includes the use of optical tapping couplers, such as T-type couplers or regenerative couplers, or of optical converters connected to the destination end of the optical fiber.

Such systems present a number of difficulties. For example, most short period gratings typically have periodicities of ½ microns. When such short periodicities are present, the light carrying the optical signal gets reflected back in the direction from which it came. When the light gets reflected back in this manner, it is more difficult to couple the light from the core. Moreover, because the short periodic gratings reflect the light backward from the direction of propagation, they have by their nature a low degree of sensitivity to external modulation and are thus not effective as an optical switching mechanism, and as such they are typically used for tuning purposes only. The mechanical tapping coupler devices, on the other hand, are also not desirable because additional switching devices or converters must be used in conjunction with the coupling devices to achieve the switching capability and the switching must be done at either the optical signal's point of origination or termination, thereby eliminating any advantages associated with tapping into the core at a midpoint between the optical fiber's ends. Additionally, in many of these devices it is necessary to grind into the cladding by about 40 to 50 microns in order to assure a high quality data readout. In such instances, the structure of the optical fiber can be compromised, which can affect the quality of optical data within the core.

Therefore, there is a need in the art for an optical switching system that is simple in design, versatile in the point of application to the optical fiber and that has a high degree of sensitivity, thereby allowing the switching function to be accomplished as great speeds. The optical switching system of the present invention addresses these needs.

SUMMARY OF THE INVENTION

The present invention provides an optical switching system for use with an optical fiber that has a core of a prescribed refractive index $n_1$ and a cladding that has a prescribed refractive index of $n_2$ and that is configured to carry an optical signal. Preferably, the optical fiber's core includes a photosensitive dopant, and the cladding is preferably comprised of an electrooptic or magnetooptic material. Moreover, in a preferred embodiment, the cladding comprises multiple index layers and the core has a refractive index profile that varies with a radial distance from the center of the core. In a preferred embodiment, the optical switching system comprises an optical switch coupled to the optical fiber and includes a grating within the core. The optical switch has selectable non-diverting and forward-diverting modes of operation wherein the optical switch alters at least one of the prescribed refractive indices of the core $n_1$ or the cladding $n_2$: to render the grating substantially transparent to the optical signal as the optical switch operates in the non-diverting mode or, alternatively, to allow the grating to divert at least a portion of the optical signal forward and into the cladding as the optical switch operates in the forward-diverting mode. The grating preferably has a periodicity that substantially increases a sensitivity of the grating to changes in the refractive index of the core or the cladding.

Preferably, the grating comprises a long period fiber grating comprising a fiber that has a plurality of index perturbations of width w spaced apart by a periodic distance $\Lambda$ (i.e. periodicity) where 10 $\mu m \leq \Lambda \leq 2000$ $\mu m$. A long period grating is defined as a periodic sequence of perturbations in which the periodic distance $\Lambda$ is greater than the wavelength of the optical signal. Preferably, the perturbations are manifest in the refractive index of a region in the fiber. These perturbations have an effect on the light, in both the core and the cladding. The refractive index of the core, the cladding or the grating can be altered by the optical switch to render the grating substantially transparent to the optical signal as the optical switch operates in the non-diverting mode or, alternatively, to allow the grating to divert at least a portion of the optical signal forward and into the cladding as the optical switch operates in the forward-diverting mode.

In another aspect of the present invention, the optical switching system further comprises an index modifier for altering the refractive index of the fiber's core or cladding. Preferably, the index modifier is a heating element that is couplable to the optical fiber and that is configured to transmit heat to the optical fiber, thereby altering the refractive index of the core and the cladding. The heating element could be a microwave absorber and an external microwave source may control the switching functions of the device. Alternatively, the index modifier comprises a piezoelectric material couplable to the optical fiber adjacent the grating. In yet another aspect, the index modifier is an optical source couplable to the optical fiber for generating an intensive optical pulse into the optical fiber, such as a laser. This modification leads to switching by the weak dependence of refractive index on the incident light. In another method of implementation, the cladding is made up of (or surrounded by) an electrooptic material, whereby the index of the cladding (or the region surrounding the cladding) is modified by an external electrical signal. This modification further leads to the switching action described earlier. The material above may be alternatively magnetooptic with the control signal being a magnetic field. Alternatively, the index modifier is an acoustic signal that generates a standing wave patten in a region of the optical fiber.

In another embodiment, the optical switching system further comprises an optical detector coupled to the optical fiber for detecting the optical signal that is diverted into the cladding of the optical fiber by the grating.

In yet another aspect of the present invention, there is provided an optical fiber switchable tapping device. The optical fiber switchable tapping device comprises an optical signal path including an optical fiber that has a core of a first prescribed refractive index $n_1$ and a cladding of a second prescribed refractive index $n_2$ and that is configured to carry an optical signal. Preferably, the cladding comprises an electrooptic or magnetooptic material. The optical fiber switchable tapping device further includes an optical switching system for directing the optical signal. The optical switching system comprises an optical switch coupled to the optical fiber and includes a grating within the core that has a third prescribed refractive index $n_3$. The optical switch has selectable non-diverting and forward-diverting modes of operation wherein the optical switch alters at least one of the first, second or third prescribed refractive indices: to render the grating substantially transparent to the optical signal as the optical switch operates in the non-diverting mode or, alternatively, to allow the grating to divert at least a portion of the optical signal forward and into the cladding as the optical switch operates in the forward-diverting mode. The grating preferably has a periodicity that substantially increases a sensitivity of the grating to changes in at least one of the first second or third refractive indices $n_1$, $n_2$, $n_3$. In one embodiment, the optical fiber includes a flat, polished portion on an outer surface of the cladding for coupling an optical signal detector thereto.

In another aspect of this tapping device embodiment, the device further comprises an index modifier for altering at least one of the first prescribed refractive index $n_1$, the second prescribed refractive index $n_2$ or the third prescribed refractive index $n_3$. The index modifier may be a heating element couplable to the optical fiber that is configured to transmit heat to the optical fiber to thereby modify at least one of the first, second or third prescribed refractive indices $n_1$, $n_2$, $n_3$. Alternatively, the index modifier may be comprised of a piezoelectric material couplable to the optical fiber adjacent the grating, or it may be an optical source couplable to the optical fiber for generating an intensive optical pulse into the optical fiber, such as a laser.

In another aspect, the switchable tapping device further comprises a detector coupled to the optical fiber for detecting the optical signal diverted into a cladding of the optical fiber by the grating.

The grating is preferably comprised of a long period fiber grating comprising a fiber having a plurality of index perturbations (along the axis) of width w spaced apart by a periodic distance $\Lambda$ where $10~\mu m \leq \Lambda \leq 2000~\mu m$.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
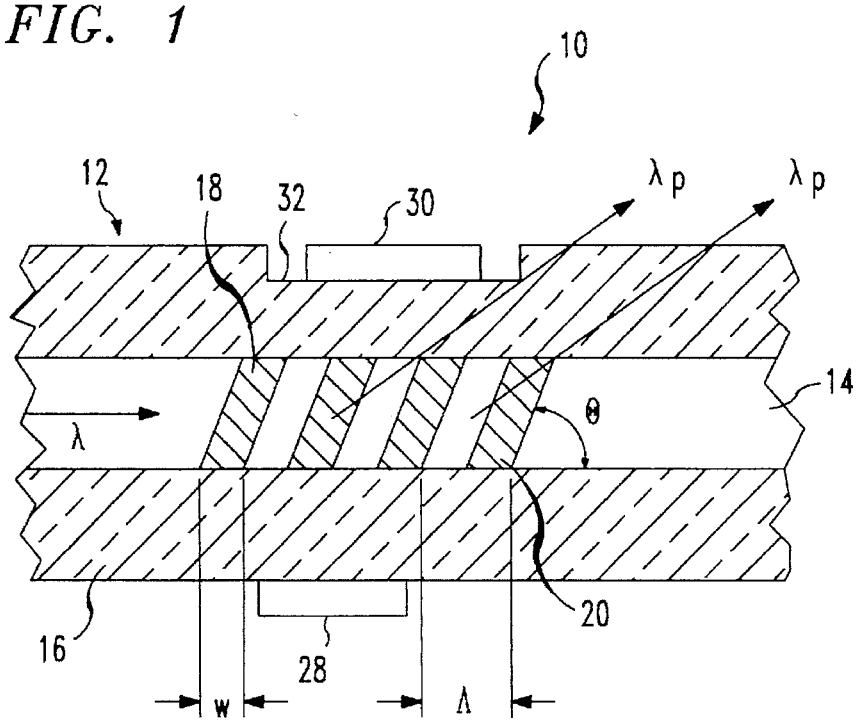
FIG. 1 illustrates a schematic cross section of a long period spectral shaping device.

Referring initially to FIG. 1, there is illustrated a schematic cross section of an embodiment of an optical switching system 10 of the present invention comprising a length of optical fiber 12 for transmitting an optical signal in a forward propagating mode. The optical fiber 12 has a core 14 with a predetermined refractive index of $n_{core}$ surrounded by a cladding 16 with a lower predetermined refractive index of $n_{clad}$. In some embodiments, the cladding 16 may comprise multiple layers of different indices, each possessing a different refractive index. Also, the core refractive index $n_1$ may not necessarily be a step function but may vary radially across the core 14. Preferably, the core 14 includes one or more gratings 18. In a preferred embodiment, the grating 18 is a long period grating that preferably comprises a plurality of index perturbations 20 of width w spaced apart by a periodic distance $\Lambda$ (i.e., periodicity) where typically 10 µm≦$\Lambda$2000 µm and w is ⅕$\Lambda$≦w≦⅘$\Lambda$ and preferably w=½$\Lambda$. The perturbations 20 each have a refractive index, $n_{per}$, and are formed within the core 14. The perturbations 20 are preferably formed at an angle of $\theta$ ($2°\leq\theta 90°$) with the longitudinal axis of the optical fiber 12. In such configurations, the optical fiber 12 is designed to transmit a broad band optical signal of wavelength $\lambda$. Further, the sensitivity of the grating can be simplified to be dependent on the difference between the core and the cladding indices, which can be expressed as: S=1($n_{core}$−$n_{clad}$.) where S is the sensitivity of the grating to external perturbations, $n_{core}$ is the effective modal index of the core and $n_{clad}$ is the effective modal of the cladding and $n_{core}$ >$n_{clad}$. The grating works on the principle that for a given peridocity $\Lambda$, the guided core mode couples out to the unguided cladding mode when the following phase matching condition is met: $n_{core}$−$n_{clad}$=$\lambda/\Lambda$, where $n_{core}$ is the effective index of the core mode, $n_{clad}$ is the effective index of the cladding mode and $\lambda$ is the wavelength of the optical signal at which the equation is satisfied. By effective index of the modes, it is meant that the propagation constant of the individual modes, $\beta$, is divided by the free space propagation constant k, where k=$2\pi/\lambda$ such that, $n_{core}$=$\beta_{core}/k$, and $n_{clad}$=$\beta_{clad}/k$. The above phase matching condition shows that one can modify any of the three free parameters at hand, namely, the effective index of the core, the effective index of the cladding or the grating periodicity and change the wavelength at which the device operates in one of its states. In general, the effective indicies of the core $n_{core}$ and cladding $n_{clad}$ modes are directly dependent on the refractive indices (a material property) of both the core $n_1$ and the cladding $n_2$. As such, a small change in the difference between $n_{core}$ and $n_{clad}$, produces a substantial increase in the sensitivity of the grating to changes in the prescribed refractive index in the core 14. What is meant by "substantial" is that the sensitivity is increased by at least 1%.

In contrast, short period gratings have a substantially less sensitivity as reflected by the equation: S=1($n_{core}$+$n_{clad}$.). To compare the sensitivities of the two methods, the following example is illustrative: an increase in the core effective index $n_{core}$ by 0.0001 will lead to the sensitivity of the long period grating to change by 3%. In contrast, the same change in effective index (0.0001) will change the short period grating sensitivity by 0.0015%, thus implying that the long period grating is 2000 times more sensitive.

When the optical switch 10 is engaged, the spacing $\Lambda$ of the perturbations 20 is so chosen to shift a transmitted optical signal with a wavelength $\lambda_p$, into the region of $\lambda_1$ to $\lambda_2$. Depending on the application, the region of $\lambda_1$ to $\lambda_2$ may be either the "on" position or the "off" position for the optical switch 10. Preferably, however, the region of $\lambda_1$ to $\lambda_2$ is the on position; that is, once the optical switch 10 is engaged, the change in the refractive indices of the perturbations 20 and the core 14 shifts the optical signal's wavelength $\lambda_p$, from a non-diverting mode wherein the optical signal travels in the propagated direction (i.e., forward direction) within the core 14 to a forward-diverted mode wherein the optical signal is preferably diverted into the cladding 16. As the optical switch 10 is engaged to shift the wavelength $\lambda_p$ from $\lambda_{p\,off}$ to $\lambda_{p\,on}$, the optical signal is diverted into the cladding 16 and the intensity of the optical signal band centered about $\lambda_p$ is accordingly reduced. In contrast with conventional short period gratings that reflect light in a backward direction (i.e., in a direction opposite from the propagating direction), these preferred long period gratings 18 remove the light without reflection by convening it from a non-diverting mode to a forward-diverting mode.

Figure 2:
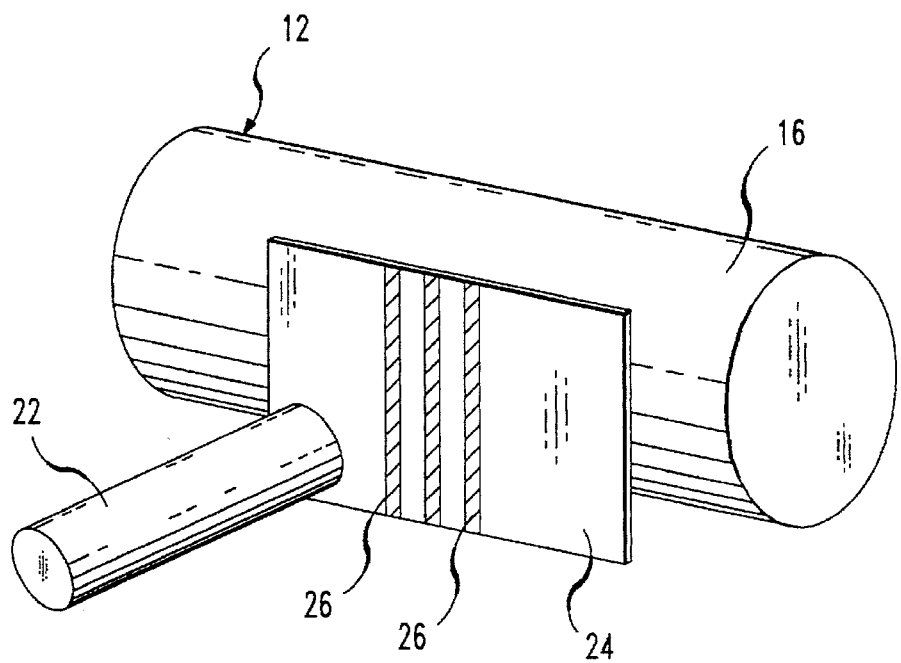
FIG. 2 illustrates apparatus useful in making the device of FIG. 1.

Preferably, the optical fiber 12 is a single optical mode fiber that has a silica core doped with a photosensitive material, such as germanium, phosphorous, tin or with electroptic or magnetooptic materials. Further, the optical fiber 12 may be loaded with molecular hydrogen or deuterium to enhance its photosensitivity. The long period grating 18 can then be formed by selectively exposing the core 12 to beams of intense light of width w at locations separated by the distance $\Lambda$. The preferred exposure source is UV radiation from a KrF excimer laser. Proper spacing can be effected by exposing the optical fiber core 14 through a slit of width w and then moving the optical fiber 12 to the next exposure site. Alternatively, as shown in FIG. 2, the optical fiber 12 can be exposed to a wide beam from a laser 22 through an amplitude mask 24 providing a plurality of transparent slits 26 at spacing $\Lambda$ and opening width w. Preferably the exposure dosages for each slit 26 is on the order of 1000 pulses of >100 mJ/cm$^2$ fluence/pulse, and the number of perturbations is in the range of 10–100 depending on the specific application.

Continuing to refer to FIG. 1, in a preferred embodiment thereof, the optical switch 10 includes an index modifier 28 that alters the effective index of the core 12, $n_{core}$, or the effective index of the cladding 16, $n_{clad}$, or more preferably alters both the effective index of the core 12, $n_{core}$, and the effective index of the perturbations 20, $n_{per}$, in the grating 18 when the optical switch 10 is engaged. The index modifier 28 may be a heating element that is couplable to the optical fiber 12 and is configured to transmit heat to the optical fiber 12, thereby preferably altering the effective indices of the core 14, $n_{core}$, the cladding 16, $n_{clad}$ and the perturbations 20 $n_{per}$. Alternatively, the index modifier 28 may comprise a piezoelectric material couplable to the optical fiber 12 adjacent to the grating 18. The piezoelectric material includes any type of piezoelectric that may be coupled to the optical fiber 12, such as a piezoelectric material applied directly to the optical fiber 12 or a piezoelectric stretcher coupled to the optical fiber 12. More preferably, however, the index modifier 28 is an optical source, such as a laser, that is couplable to the optical fiber 12 and that is capable of generating an intensive optical pulse into the optical fiber 12, thereby preferably inducing a change in both the refractive indices of the core 14, $n_{core}$ and the perturbation 20 $n_{per}$. In another method of implementation, the cladding is made up of (or surrounded by) an electrooptic material, whereby the index of the cladding (of the region surrounding the cladding) is modified by an external electrical signal. This modification further leads to the switching action described earlier. The material above may be alternatively magnetooptic with the control signal being a magnetic field.

Also included in the optical switch 10 of the present invention is a detector 30 that is capable of detecting the optical signal that is removed from the core 14. As illustrated, the optical fiber 12 has a flat polished portion 32 that is formed in just the first few microns of the cladding 16. The detector 30 provides a means for reading the optical signals that are removed from the core 14. In such instances, the optical switching device can be used as a tapping device for tapping out selected portions of an optical signal to insure power or date quality control.

When used as a tapping device, the optical fiber switchable tapping device comprises an optical signal path including the optical fiber 12 that has a core 14 of a first prescribed refractive index $n_1$ and a cladding 16 of a second prescribed refractive index $n_2$ and that is configured to carry an optical signal of a prescribed bandwidth. The optical fiber switchable tapping device further includes the optical switching system for directing the optical signal. The optical switching system comprises the optical switch 10 coupled to the optical fiber 12 and includes a grating 18 within the core 14 that has a third prescribed refractive index $n_3$. The optical switch 10 has selectable non-diverting and forward-diverting modes of operation wherein the optical switch 10 alters at least one of the first, second or third prescribed refractive indices $n_1$, $n_2$, $n_3$: to render the grating 18 substantially transparent to the optical signal as the optical switch 10 operates in the non-diverting mode or, alternatively, to allow the grating 18 to divert at least a portion of the optical signal forward and into the cladding 16 as the optical switch 10 operates in the forward-diverting mode. The grating 18 preferably has a periodicity that substantially increases the sensitivity of the grating 18 in response to changes in the first, second or third refractive indices.

Figure 3:
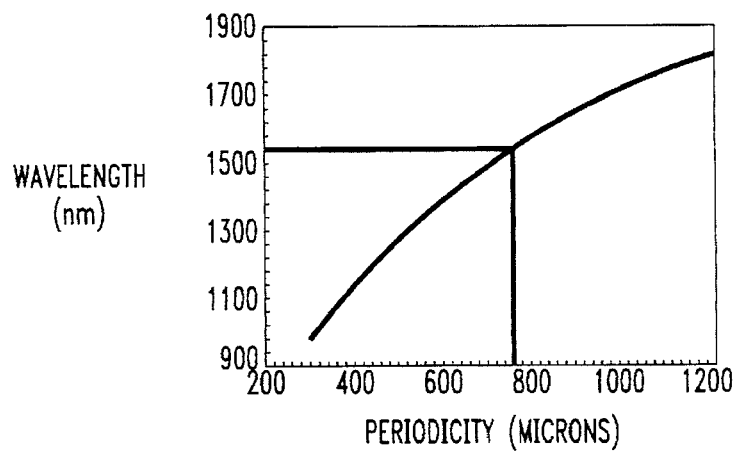
FIG. 3 illustrates a graphical plot of a center wavelength versus period useful in making the device of FIG. 1.
Figure 4:
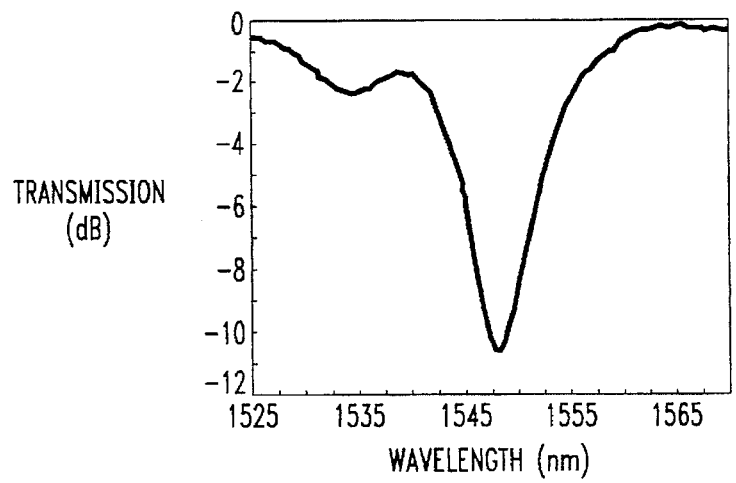
FIG. 4 illustrates a typical transmission spectrum of a long-period shaping device used for removal of light in a wavelength region around $\lambda_p$.

Turning now to FIG. 3 in conjunction with FIG. 1, there is illustrated a graph showing the periodic spacing $\Lambda$ for removing an optical signal centered about a wavelength $\lambda_p$ when the optical switch 10 is engaged. On engagement of the optical switch 10, the optical signal passes through a first perturbation 20 and under goes a phase change that is dependent on the refractive index, $n_{per}$, and the length of the perturbation 20. As the optical signal passes from the first perturbation 20, it undergoes another phase change due to the refractive index of the core 14 $n_{core}$. Thus, as the optical signal continues moving through the remaining length of the grating 18, the various phase changes add up constructively, and the phase changes that occur to the optical signal after it has passed through several perturbations 20 (FIG. 1) will result in a phased, coherent optical signal that will transfer out from the core 14 and into the cladding 16. The transfer of the selected optical signal from the core 14 is depicted by a dip in the transmission of the grating 18 as illustrated in FIG. 4. Therefore, as indicated by the graph depicted in FIG. 4, to make a device for removing a wavelength of light centered around 1540 nm, a spacing of about 760 μm for the perturbations is chosen, as shown in FIG. 3. It will, of course, be appreciated that the change in the refractive index of the core 14, $n_{core}$, effectuated when the optical switch 10 is engaged, is substantially greater than the refractive index of the perturbations, $n_{per}$. As such, it is within the scope of the present invention that the optical switch 10 could be so designed to depend on the change in the refractive index of the core 14, $n_{core}$, only.

Figure 5:
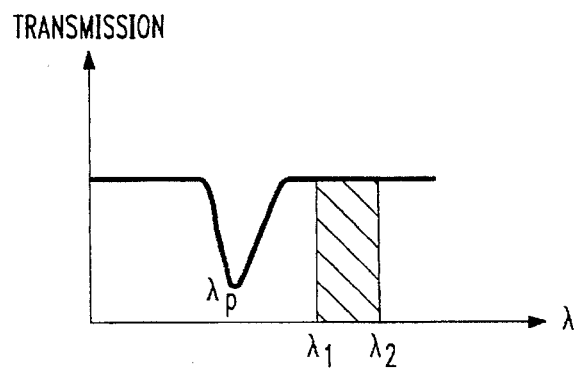
FIG. 5 illustrates a schematic graphical representation of the optical switch in the non-diverting mode, wherein the transmission spectrum is a wavelength where $\lambda_p$ is outside of the transmission range between $\lambda_1$ and $\lambda_2$.
Figure 6:
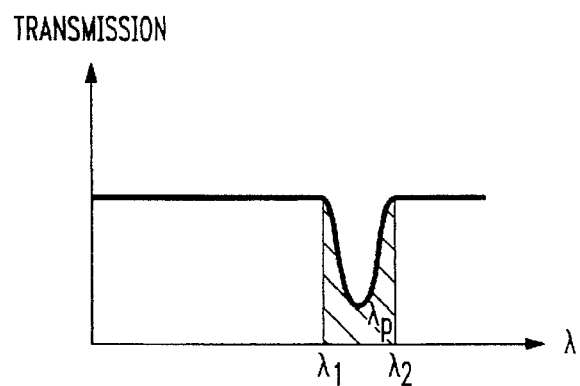
FIG. 6 illustrates a schematic graphical representation of the optical switch in the forward-diverting mode, wherein the transmission spectrum in a wavelength where $\lambda_p$ is inside of the transmission range between $\lambda_1$ and $\lambda_2$.

Turning now to FIGS. 5 and 6 in conjunction with FIG. 1, there are illustrated graphs depicting the shift of the wavelength $\lambda_p$ from an "off" position to an "on" position. In FIG. 5, the dip in the transmission spectrum of wavelength $\lambda_p$ falls outside of the region of $\lambda_1$ to $\lambda_2$. Thus, in this instance, the wavelength $\lambda_p$ is not diverted from the core 14, and the optical signal will travel on through the core 14 to its end point. However, if it is desirable to remove $\lambda_p$ from the core 14, the optical switch 10 is engaged, and the refractive indices of the core 14 $n_1$ and the perturbations 20 $n_{per}$ change. The change in the refractive indices shifts $\lambda_p$ into the region of $\lambda_1$ to $\lambda_2$, and thus causes the optical signal to be removed from the core 14, as shown in FIG. 6. It should be noted that in some applications only a part of the light may be diverted into the cladding. It will, of course, be appreciated that the "on" position could be designed to be outside the region of $\lambda_1$ to $\lambda_2$ and the "off" position could be designed to be within a region of $\lambda_1$ to $\lambda_2$, depending on the application and the results desired.

Figure 7A:
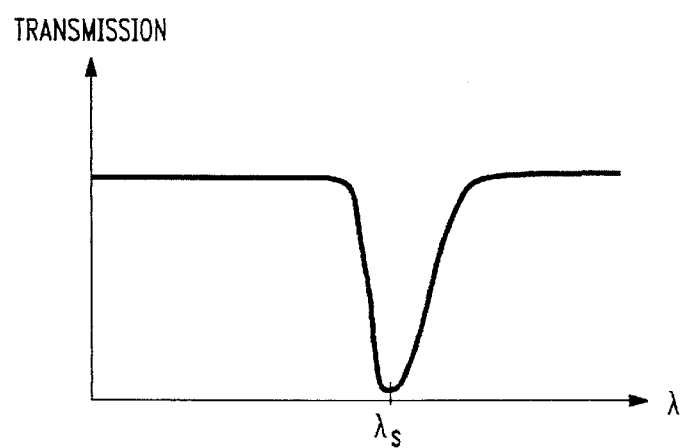
FIG. 7a illustrates a graphical representation of the natural state of the grating in the "always" off state with no external control signal.
Figure 7B:
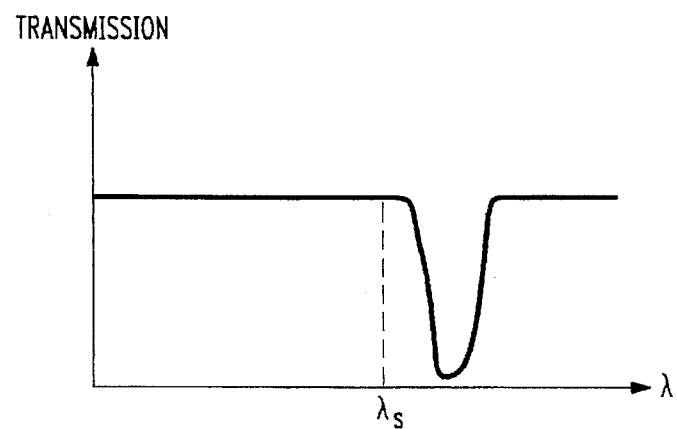
FIG. 7b illustrates a graphical representation of the modified state of the grating when the external control signal is present.

Turning now to FIGS. 7a–7d, there is illustrated, in FIG. 7a a graphical representation of the device in the "always off" state. In such instances, the control signal at wavelength $\lambda_s$ is removed from the core of the optical fiber as represented by the dip in the transmission at wavelength $\lambda_s$. In contrast, FIG. 7b is a graphical representation of the device in the "on" state wherein the grating has been modified as discussed above. The modification in the grating causes the dip in the transmission to be shifted to a wavelength other than wavelength $\lambda_s$. Accordingly, the wavelength $\lambda_s$ is not removed from the core of the optical fiber and is transmitted to the final point of destination.

Figure 7C:
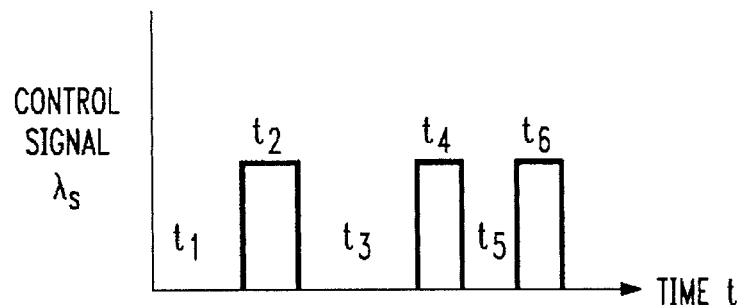
FIG. 7c illustrates a graphical representation of the timing diagram of the external control signal.
Figure 7D:
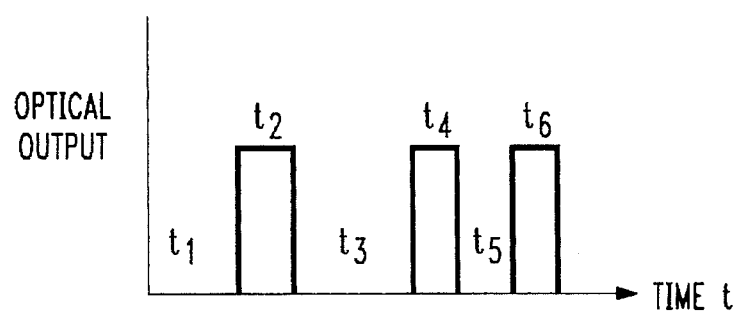
FIG. 7d illustrates a graphical representation of the resulting output optical signal due to the control signal of FIG. 7c.

The direct correlation between the off and on states of the control signal and the optical signal output from the device as a function of time is shown in FIGS. 7c and 7d. Basically, these figures show that there is a direct time correlation between the transmission of the control signal and the output of the optical signal. In other words, at the precise time when the control signal is being transmitted, the optical signal is output from the device, and at the precise time when the control signal is not being transmitted there is no optical signal output. For example, in FIG. 7c, at time $t_1$, $t_3$ and $t_5$ the control signal is not being transmitted. Accordingly, there is no optical signal output from the device at that same time $t_1$, $t_3$ and $t_5$, as shown in FIG. 7d. In contrast, at time $t_2$, $t_4$, and $t_6$, the control signal is being transmitted (FIG. 7c), which is reflected by the graph of the optical signal output at that same time $t_1$, $t_3$ and $t_5$ in FIG. 7d.

In FIG. 8a–8d, there is illustrated graphical representations of the device always in the "always on" state. As shown, FIGS. 8a–8d are the inverse of the graphs illustrated in FIGS. 7a–7d.

Figure 8A:
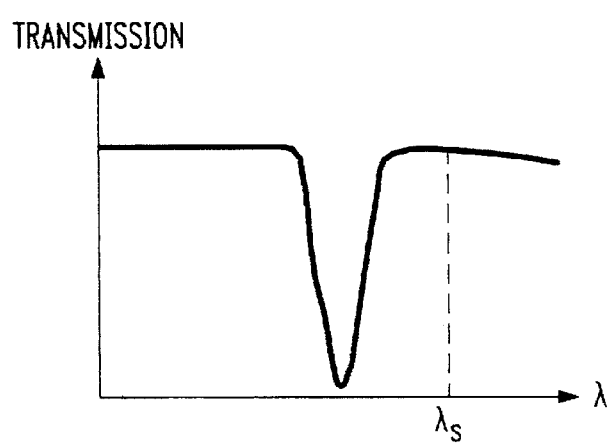
FIG. 8a illustrates a graphical representation of the natural state of the grating in the "always on" state with no external control signal.
Figure 8B:
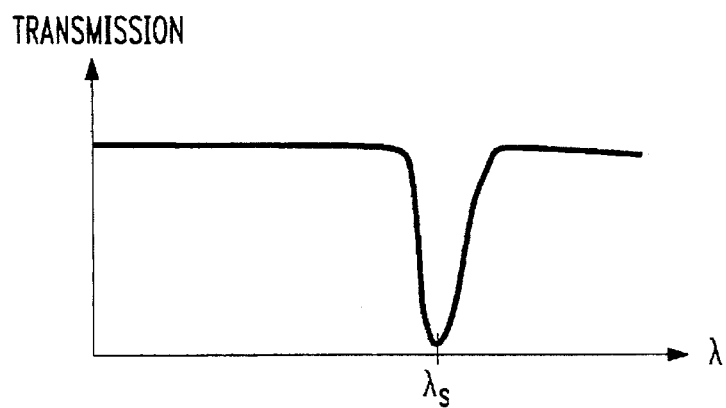
FIG. 8b illustrates a graphical representation of the modified state of the grating when the external control signal is present.

Turning now to FIGS. 8a–8d, there is illustrated, in FIG. 8a a graphical representation of the device in the "always on" state. In such instances, the control signal, wavelength $\lambda_s$, is not removed from the core of the optical fiber as represented by the dip in the transmission being shifted to a wavelength other than wavelength $\lambda_s$. In contrast, FIG. 8b is a graphical representation of the device in the "off" state wherein the grating has been modified as discussed above. The modification in the grating causes the dip in the transmission to be shifted to wavelength $\lambda_s$. Accordingly, the wavelength $\lambda_s$ is removed from the core of the optical fiber as represented by the dip in the transmission at wavelength $\lambda_s$.

Figure 8C:
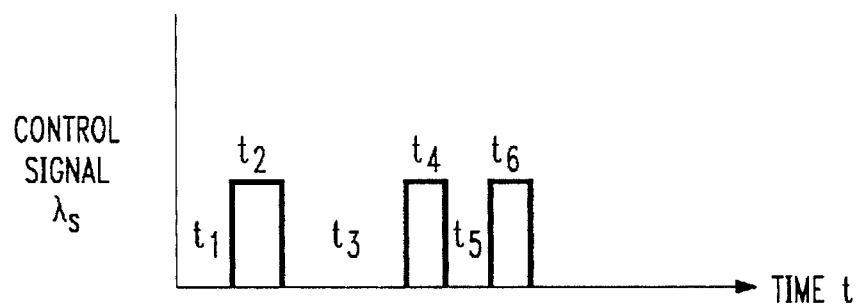
FIG. 8c illustrates a graphical representation of the timing diagram of the external control signal.
Figure 8D:
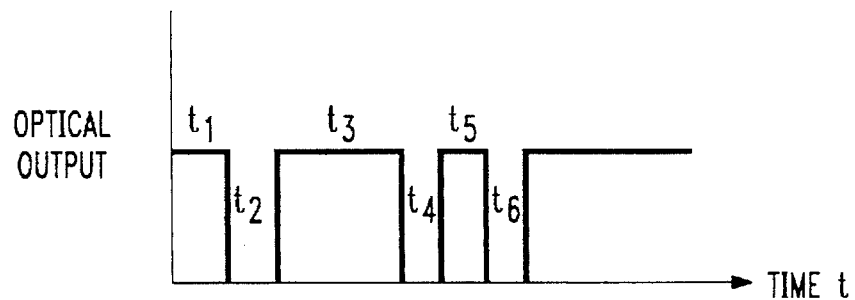
FIG. 8d illustrates a graphical representation of the resulting output optical signal due to the control signal of FIG. 8c.

The direct correlation between the on and off states of the control signal and the optical signal output from the device as a function of time is shown in FIGS. 8c and 8d. Again, these figures basically show that there is a direct correlation in time between the transmission of the control signal and the output of the optical signal. In other words, at the precise time when the control signal is not being transmitted, there is no optical signal output from the device, and at the precise time when the control signal is being transmitted there is an optical signal output from the device. For example, in FIG. 8c, at time $t_1$, $t_3$ and $t_5$ the control signal is being transmitted. Accordingly, there is an optical signal output from the device at that same time $t_1$, $t_3$ and $t_5$, as shown in FIG. 8d. In contrast, at time $t_2$, $t_4$, and $t_6$, the control signal is not being transmitted (FIG. 8c), which is reflected by the graph of the optical signal output at that same time $t_1$, $t_3$ and $t_5$ in FIG. 8d. Thus, the device of the present invention provides a device that can be quickly switched to either provide an optical signal output or remove an optical signal output for the core of an optical fiber.

Although the present invention and its advantages have been described in detail, those skilled in the art should understand that they can make various changes, substitutions and alterations herein without departing from the spirit and scope of the invention in its broadest form.

What is claimed is:

1. For use with an optical fiber having a core of a first prescribed refractive index $n_1$ and a cladding of a second prescribed refractive index $n_2$ and configured to carry an optical signal, an optical switching system for directing said optical signal, comprising:

an optical switch coupled to said optical fiber and including a grating having a third prescribed refractive index $n_2$ within said core, said optical switch having a structure that allows said optical switch to operate in selectable non-diverting and forward-diverting modes, wherein said optical switch alters at least one of said first prescribed refractive index $n_1$, said second prescribed refractive index $n_3$ or said third prescribed refractive index $n_3$, said switch operable:

to render said grating substantially transparent to said optical signal as said optical switch operates in said non-diverting mode or, alternatively, to allow said grating to divert at least a portion of said optical signal forward and into said cladding as said optical switch operates in said forward-diverting mode, said grating having a periodicity thereby substantially increasing a sensitivity of said grating to changes in at least one of said prescribed refractive index $n_1$ or said prescribed refractive indices of $n_2$.

2. The optical switching system of claim 1 further comprising an index modifier for altering at least one of said first prescribed refractive index $n_1$ said second prescribed refractive indexes of $n_2$ or said third prescribed refractive index $n_3$.

3. The optical switching system of claim 2 wherein said index modifier is a heating element couplable to said optical fiber and configured to transmit heat to said optical fiber, thereby altering at least one of said first prescribed refractive index $n_1$, said second prescribed refractive index $n_2$ or said third prescribed refractive index $n_3$.

4. The optical switching system of claim 2 wherein said cladding comprises an electrooptic material.

5. The optical switching system of claim 2 wherein said cladding comprises a magnetooptic material.

6. The optical switching system of claim 2 wherein said index modifier is comprised of a piezoelectric material couplable to said optical fiber adjacent said grating.

7. The optical switching system of claim 2 wherein said index modifier is an optical source couplable to said optical fiber for generating an intensive optical pulse into said optical fiber.

8. The optical switching system of claim 7 wherein said optical source is a laser.

9. The optical switching system of claim 1 further comprising an optical detector coupled to said optical fiber for detecting said optical signal diverted into said cladding of said optical fiber by said grating.

10. The optical switching system of claim 1 wherein said grating includes a long period fiber grating comprising a fiber having a plurality of index perturbations of width w spaced apart by a periodic distance $\Lambda$ where $10 \mu m \leq \Lambda \leq 2000 \mu m$, each of said perturbations having a perturbation refractive index alterable by said optical switch:

to render said grating substantially transparent to said optical signal as said optical switch operates in said non-diverting mode or, alternatively, to allow said grating to divert at least a portion of said optical signal forward and into said cladding as said optical switch operates in said forward-diverting mode.

11. The optical switching system of claim 1 wherein said core includes a photosensitive dopant.

12. The optical switching system of claim 1 further comprising an optical signal path including an optical fiber having a core and a cladding wherein said cladding comprises multiple index layers.

13. The optical switching system of claim 1 further comprising an optical signal path including an optical fiber having a core and a cladding wherein said core has a refractive index profile that varies with a radial distance from a center of said core.

14. An optical fiber switchable tapping device comprising:

an optical signal path including an optical fiber having a core of a first prescribed refractive index $n_1$ and a cladding of a second prescribed refractive index $n_2$ and configured to carry an optical signal; and an optical switching system for directing said optical signal, comprising:

an optical switch coupled to said optical fiber and including a grating having a third prescribed refractive index $n_3$ within said core, said optical switch having a structure that allows said optical switch to operate in selectable non-diverting and forward-diverting modes wherein said optical switch alters at least one of said first prescribed refractive index $n_1$, said second prescribed refractive index $n_2$ or said third prescribed refractive index $n_3$, said switch operable:

to render said grating substantially transparent to said optical signal as said optical switch operates in said non-diverting mode or, alternatively, to allow said grating to divert at least a portion of said optical signal forward and into said cladding as said optical switch operates in said forward-diverting mode, said grating having a periodicity thereby substantially increasing a sensitivity of said grating to changes in at least one of said first prescribed refractive index $n_1$, said second prescribed refractive index $n_2$ or said third prescribed refractive index $n_3$.

15. The optical fiber switchable tapping device of claim 14 further comprising an index modifier for altering at least one of said first prescribed refractive index $n_1$, said second prescribed refractive index $n_2$ or said third prescribed refractive index $n_3$.

16. The optical fiber switchable tapping device of claim 15 wherein said index modifier is a heating element couplable to said optical fiber and configured to transmit heat to said optical fiber, thereby altering at least one of said first prescribed refractive index $n_1$, said second prescribed refractive index $n_2$ or said third prescribed refractive index $n_3$.

17. The optical fiber switchable tapping device of claim 15 wherein said cladding comprises an electrooptic material.

18. The optical fiber switchable tapping device of claim 15 wherein said cladding comprises a magnetooptic material.

19. The optical fiber switchable tapping device of claim 15 wherein said index modifier is comprised of a piezoelectric material couplable to said optical fiber adjacent said grating.

20. The optical fiber switchable tapping device of claim 15 wherein said index modifier is an optical source couplable to said optical fiber for generating an intensive optical pulse into said optical fiber.

21. The optical fiber switchable tapping device of claim 20 wherein said optical source is a laser.

22. The optical fiber switchable tapping device of claim 14 further comprising a detector coupled to said optical fiber for detecting said optical signal diverted into said cladding of said optical fiber by said grating.

23. The optical fiber switchable tapping device of claim 14 wherein said grating comprises a long period fiber grating comprising a fiber having a plurality of index perturbations of width w spaced apart by a periodic distance $\Lambda$ where $10\ \mu m \leq \Lambda \leq 2000\ \mu m$.

24. The optical fiber switchable tapping device of claim 14 wherein said optical fiber includes a flat, polished portion on an outer surface of said cladding for coupling an optical signal detector thereto.

* * * * *